United States Patent [19]

Dormer et al.

[11] Patent Number: 4,911,557
[45] Date of Patent: Mar. 27, 1990

[54] DUAL-SPINDLE BLENDER WITH PROVISION FOR SMALL CHARGE

[75] Inventors: Franklyn C. Dormer, Durham; Paul J. Lerner, Madison, both of Conn.

[73] Assignee: Black & Decker, Inc., Newark, Del.

[21] Appl. No.: 261,605

[22] Filed: Oct. 24, 1988

[51] Int. Cl.$^4$ .................... B01F 7/16; A47J 43/046; A47J 43/08
[52] U.S. Cl. .................... 366/299; 366/297; 366/301; 366/314; 241/46.17; 241/282.2
[58] Field of Search .................... 366/297–301, 366/314, 290, 291, 292, 244–246; 99/348, 510; 241/46 B, 46.17, 73, 74, 282.1, 282.2

[56] References Cited

U.S. PATENT DOCUMENTS

| | | | |
|---|---|---|---|
| 2,698,164 | 12/1954 | Lamb | 366/314 |
| 2,930,596 | 3/1960 | Waters | 366/314 |
| 3,024,010 | 3/1962 | Sperling | 366/314 |
| 3,722,831 | 3/1973 | Bialas et al. | 366/300 |
| 4,087,053 | 5/1978 | Voglesonger | 241/282.1 |
| 4,256,407 | 3/1981 | Seiderman | 366/300 |
| 4,462,694 | 7/1984 | Ernster et al. | 366/314 |

FOREIGN PATENT DOCUMENTS

| | | | |
|---|---|---|---|
| 417549 | 8/1925 | Fed. Rep. of Germany | 366/301 |
| 2131709 | 6/1984 | United Kingdom | 99/348 |

Primary Examiner—Harvey C. Hornsby
Assistant Examiner—Joseph S. Machuga
Attorney, Agent, or Firm—Barry E. Deutsch

[57] ABSTRACT

A dual-spindle blender includes a container having two intersecting lobes forming a figure-eight cross section with a cutter blade assembly disposed centered in each lobe. The bottom of one of the lobes is lower than that of the other lobe so that, when small quantities of material are treated, it preferentially falls into the lower bottom to produce a deeper pool which can be operated on by the associated cutter blade assembly. In one embodiment of the invention, the cutter blade assemblies are at the same height and are spaced with their planes of rotation non-intersecting. In another embodiment of the invention, the cutter blade assemblies are displaced in height, whereby the blades are offset from each other. In this embodiment the offset of the blade heights optionally permits their planes of rotation to intersect without suffering blade strikes.

1 Claim, 2 Drawing Sheets

DUAL-SPINDLE BLENDER WITH PROVISION FOR SMALL CHARGE

BACKGROUND OF THE INVENTION

The present invention relates to housewares and, more particularly, to electric mixers, blenders and food processors.

The electric blender such as disclosed, for example, in U.S. Pat. No. 3,156,278 has become an important element in many kitchens throughout the world. Such blenders typically include a bowl having a shaft centrally disposed in its bottom. One or more cutter blades, each having a plurality (typically four) of lobes, is rotated by a motor turning the shaft at high speed to comminute and/or blend materials in the bowl. In some such blenders, the bowl includes a generally clover-leaf shape to aid in mixing of the materials moving in rotary motion within the bowl.

U.S. Pat. No. 4,256,408, the disclosure of which is herein incorporated by reference, describes a dual blender having a bowl with a figure-eight cross section. A motor-driven shaft is centered in each of the lobes to improve the mixing action of the apparatus over that attained by a conventional single-shaft blender. In order to avoid conflict between blade tips without requiring synchronizing of the blade rotational positions, the device of this patent employs non-overlapping blades. Some of the references in the '408 patent also use a figure-eight container with dual rotating elements. These devices generally use overlapping rotating devices and thus require blade synchronization.

We have discovered that, although the apparatus of the referenced '408 patent does, indeed, improve mixing and/or comminution, a few problems with the design impair its performance. In particular, the use of a figure-eight bowl produces a cross section near the bottom which is substantially greater than that of a single-element device. A small amount of material to be treated makes a substantially shallower layer in the figure-eight bottom than in the circular bottom of prior-art device. As a consequence, a small amount of material in the bottom may not be reachable by the blades.

The '408 patent requires that its co-planar blades have their tip planes non-intersecting in order to avoid tip collision in a device without blade synchronization. Avoidance of tip collision is, of course, desirable and necessary. Product simplification also makes it desirable to avoid requirements for blade synchronization. However, we have found that interleaved blades do a better job of mixing, particularly of liquid or semi-liquid materials.

OBJECTS AND SUMMARY OF THE INVENTION

It is an object of the invention to provide a dual-spindle blender that overcomes the drawbacks of the prior art.

It is a further object of the invention to provide a dual-spindle blender having means for treating smaller quantities of material than is possible with devices of the prior art.

It is a still further object of the invention to provide a dual-spindle blender wherein a floor of one of the lobes is lowered to a position such that small amounts of material in the blender tend to drain into the lower lobe, whereby a deeper layer is formed in the lower lobe than would be the case if the same amount of material were spread equally between the two lobes. The impeller in the lobe with the lower floor is arranged to reach lower than that of the impeller in the lobe with the higher floor.

It is a still further object of the invention to provide a dual-spindle blender wherein both the floor and the impeller in one of the lobes are positioned lower than those in the other lobe. In addition to permitting the formation of a deeper layer of material in the lower lobe, this offsets the blades of the two impellers so that they can be interleaved without blade collision and without requiring blade synchronization.

Briefly stated, the present invention provides a dual-spindle blender including a container having two intersecting lobes forming a figure-eight cross section, with a cutter blade assembly disposed centered in each lobe. The bottom of one of the lobes is lower than that of the other lobe so that, when small quantities of material are treated, it preferentially falls into the lower bottom to produce a deeper pool which can be operated on by the associated cutter blade assembly. In one embodiment of the invention, the cutter blade assemblies are at the same height and are spaced with their planes of rotation non-intersecting. In another embodiment of the invention, the cutter blade assemblies are displaced in height, whereby the blades are offset from each other. In this embodiment the offset of the blade heights optionally permits their planes of rotation to intersect without suffering blade strikes.

According to an embodiment of the invention, there is provided a blender comprising: a blender container, first and second cutter blade assemblies in the blender container, means for rotatably supporting the first and second cutter blade assemblies in the blender container, a first bottom of the blender container below the first cutter blade assembly, a second bottom of the blender container below the second cutter blade assembly, and the first bottom being a predetermined distance lower than the second bottom, whereby a material in the blender container forms a higher pool over the first bottom than over the second bottom.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
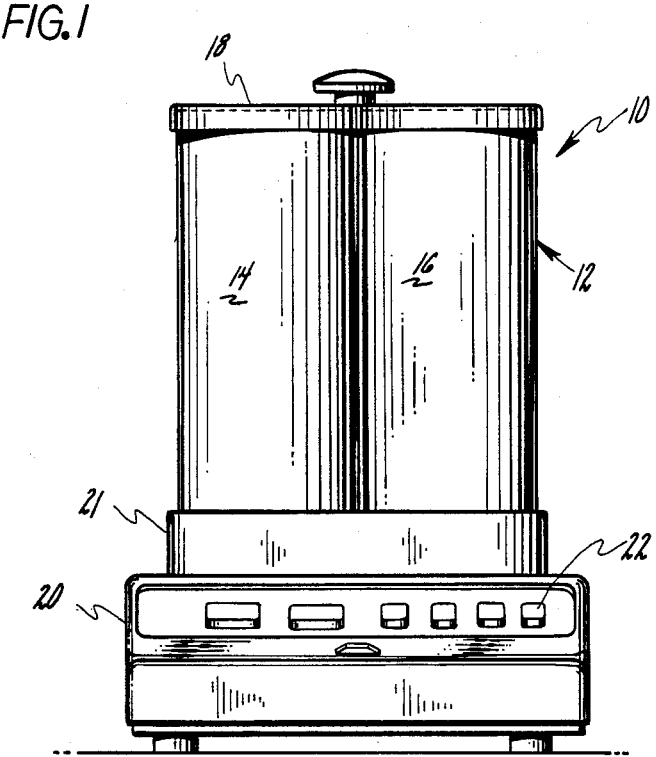
FIG. 1 is a side view of a dual-spindle blender in which the present invention may be employed.

Referring to FIG. 1, there is shown, generally at 10, a dual-spindle blender in which the present invention may be employed. A container 12, consisting of first and second lobes 14 and 16, rests in an upturned edge 21 of a base 20. Lobes 14 and 16 preferably form a figure-eight cross section, as disclosed in the referenced U.S. Pat. No. 4,256,408. Conventional control switches 22 are provided to control a speed of dual-spindle blender 10.

Figure 2:
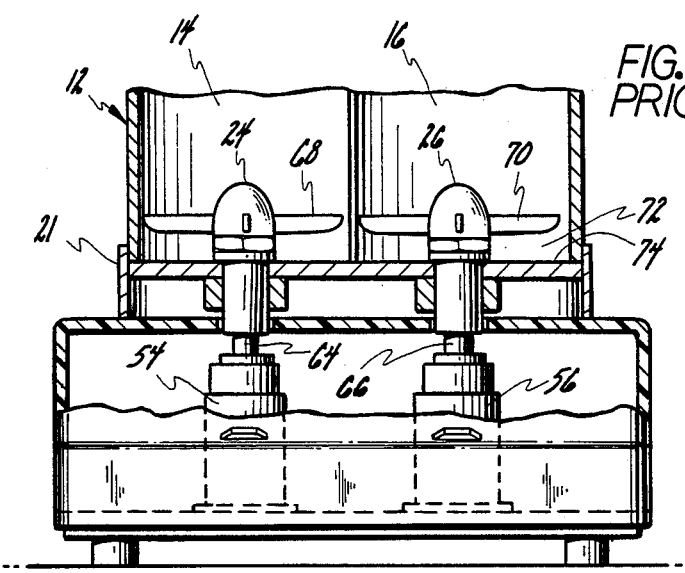
FIG. 2 is a cross section of a dual-spindle blender according to the prior art.

Referring now to FIG. 2, container 12 contains first and second spindles 24 and 26 rotatably supported on respective shafts 64 and 66 of motors 54 and 56. As is conventional, spindle 24 includes a plurality of cutter blades 68 disposed to rotate in a first common plane. Similarly, spindle 26 includes a plurality of cutter blades 70 disposed to rotate in a second common plane, coplanar with the first common plane. Since the two common planes are coplanar, provision must be made for avoiding damaging contact between cutter blades 68 and cutter blades 70. In the illustrated embodiment, the use of two independent motors 54 and 56 requires that contact be avoided by spacing shafts 64 and 66 apart a distance equal to more than twice the distance from the axis of shaft 64 to the tip of cutter blade 68. This assumes that the radii of cutter blades 68 and 70 are equal.

Further technique may be employed for avoiding tip collision of cutter blades 68 and 70. Shafts 64 and 66 can be placed close enough together that the planes of rotation of their respective cutter blades intersect. Instead of using two motors 54 and 56, a single motor may be used driving one of shafts 64 or 66. Positive connection of shafts 64 and 66 through, for example a coupling chain or toothed belt (not shown) ensures that cutter blades 68 and cutter blades 70 interleaf in a synchronized fashion. This provides the extra agitation and mixing from overlapping rotational planes. However, the extra parts and the additional assembly labor render this a less desirable solution.

It will be noted that a substantial vertical distance 72 exists between cutter blade 70 and a floor 74 of container 12. The combined floor area 74 of lobes 14 and 16 is relatively large, compared to that found in a prior-art blender of a type (not shown) having a single spindle. As a result, a particular volume of material to be treated tends to form a shallower pool in container 12 than in a single-spindle prior-art blender. Thus, it takes a larger volume of material in container 12 to raise the level of the material to a height at which it can be contacted effectively by cutter blades 68 and 72.

Figure 3:
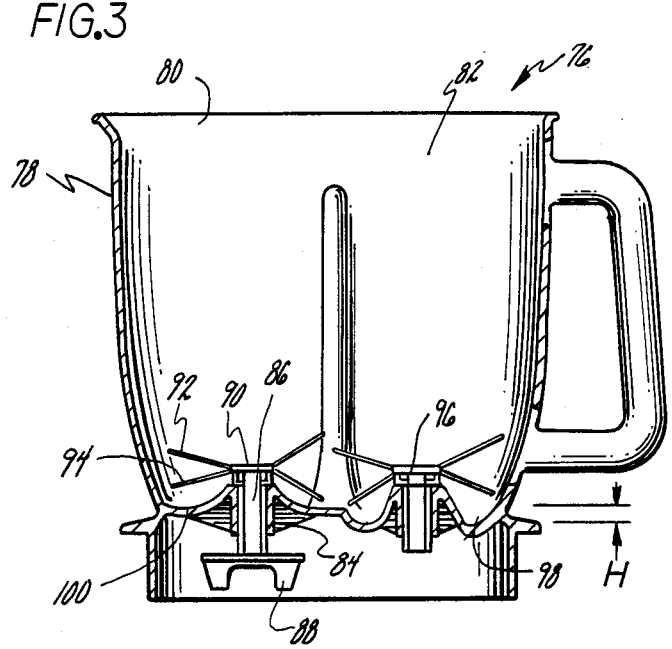
FIG. 3 is a cross section of a dual-spindle blender according to an embodiment of the invention.

Referring now to FIG. 3, there is shown, generally at 76, a dual-spindle blender according to an embodiment of the invention. A container 78 is formed with first and second intersecting lobes 80 and 82 to form a structure having a generally figure-eight cross section. A shaft guide 84, centered in a bottom of lobe 80 rotatably guides a shaft 86. Shaft 86 may be rotated by a motor (not shown) through a conventional lost-motion coupling 88. A cutter blade assembly 90 consists of first and second cutter blades 92 and 94 affixed at their centers to the top of shaft 86. One end of cutter blades 92 and 94 is deflected upward and the other end of these elements is deflected downward. The deflection angles of all of the ends of cutter blade assembly 90 are different, so that a maximum volume of material in lobe 80 is affected by rotation thereof. A similar cutter blade assembly 96 is disposed atop a shaft (omitted from the figure in order to reduce clutter). The centers of cutter blade assemblies 90 and 96 are spaced far enough apart to ensure that the tips of cutter blades 92 and 94 in lobe 80 cannot contact the tips of their counterparts in lobe 82.

The vertical positions of cutter blade assemblies 90 and 96 are about equal. A bottom 98 of lobe 82 is disposed a substantial distance H lower than a bottom 100 of lobe 80. The value of H is typically on the order of several millimeters. As a consequence of the uneven level of the bottoms 98 and 100, when small quantities of material, particularly liquid, is placed in container 78, it falls into bottom 98, wherein it forms a pool having a height about twice as high as the pool which would form if both bottoms were at the same height. Thus, cutter blade assembly 96 has such a deeper pool available for blending when small quantities are available. When larger quantities of material are added, the level of pool rises and enters lobe 80, whereupon normal operation is performed.

For best results, the downward-deflected tips of cutter blade assembly 96 should be deflected further downward than those of cutter blade assembly 90 in order to permit cutter blade assembly 96 to reach material lower down in bottom 98. This requires that cutter blade assemblies 90 and 96 preferably have different shapes.

The manner in which rotational torque is generated and connected to cutter blade assemblies 90 and 92 is a matter of indifference to the present invention. One electric motor (not shown) may drive cutter blade assemblies 90 and 96 through suitable coupling elements or, alternatively, two motors (also not shown) may be employed, each driving one of cutter blade assemblies 90 and 96. Such motors and coupling techniques are considered to be conventional, being fully disclosed in the referenced prior art, and thus need not be further detailed here.

Figure 4:
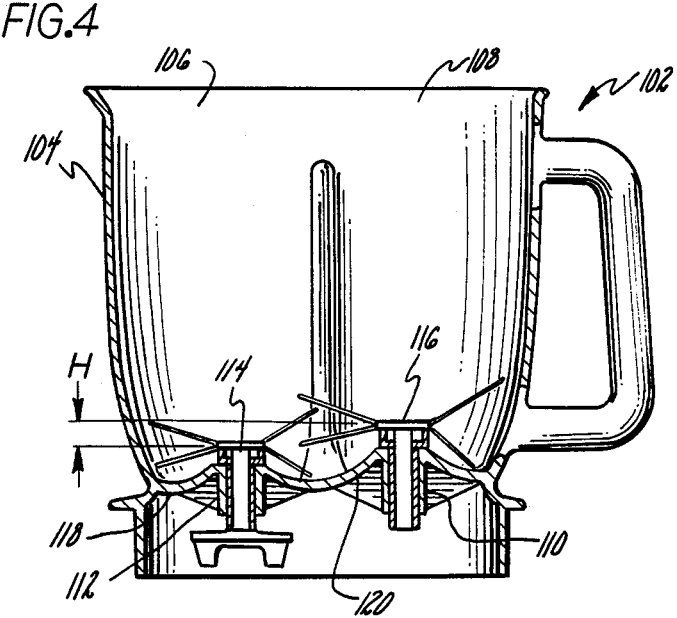
FIG. 4 is a cross section of a dual-spindle blender according to a further embodiment of the invention.

Referring now to FIG. 4, a dual-spindle blender 102 includes a container 104 formed of intersecting lobes 106 and 108 to form a structure having a figure-eight cross section. A shaft guide 110 centered in the bottom of lobe 108 is disposed a distance H higher than a similar shaft guide 112 centered in lobe 106. The different heights of shaft guides 110 and 112 places the heights of cutter blade assemblies 114 and 116 at the same height stagger. In addition, a bottom 118 of lobe 80 is also disposed the same distance H lower than a bottom 120 of lobe 108. As a consequence, the relationship between the blades of cutter blade assembly 114 and bottom 118 is the same as that between the blades of cutter blade assembly 116 and bottom 120. Therefore, cutter blade assemblies 114 and 116 can be identical parts, thereby reducing manufacturing cost by eliminating one type of part as compared to the apparatus of FIG. 3.

The difference in height of bottoms 118 and 120 permits a small quantity of material to fall into bottom 118 where it can be contacted by cutter blade assembly 114, as in the embodiment of FIG. 3.

In addition to the provision of a lower bottom for mixing small quantities, the embodiment of FIG. 4 also permits interleaving of blades of cutter blade assemblies 114 and 116 without contact therebetween. As shown, the blades of cutter blade assemblies 114 and 116 are interleaved. This interleaving is accomplished by the different heights at which these elements are placed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A blender comprising:
   a blender container having first and second lobes;
   first and second cutter blade assemblies respectively disposed in said first and second lobes of said blender container;

means for rotatably supporting said first and second cutter blade assemblies respectively in said first and second lobes of said container;

said first lobe having a first bottom below said first cutter blade assembly;

said second lobe having a second bottom below said second cutter blade assembly;

said first bottom being a predetermined distance lower than said second bottom, whereby a material in said blender container forms a higher pool over said first bottom than over said second bottom.

said first cutter blade assembly includes at least a first cutter blade rotatable about a center of said first blade assembly;

said second cutter blade assembly includes at least a second cutter blade rotatable about a center of said second blade assembly;

the centers of said first and second cutter blade assemblies being at substantially the same height; and each of said cutter blades having an end, with the end of said first cutter blade being deformed so that it is positioned vertically lower in said container than the end of said second cutter blade.

* * * * *